G. NUESELL.
GASOLENE TANK INDICATOR.
APPLICATION FILED JUNE 22, 1915.
1,171,632.
Patented Feb. 15, 1916.
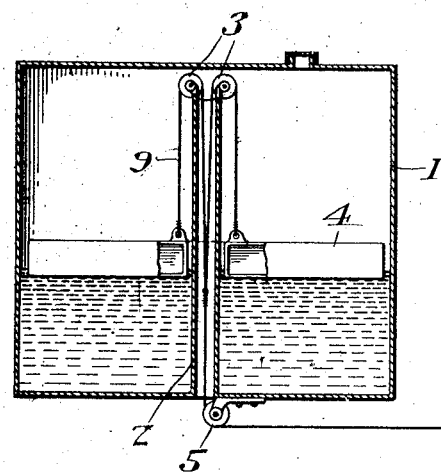
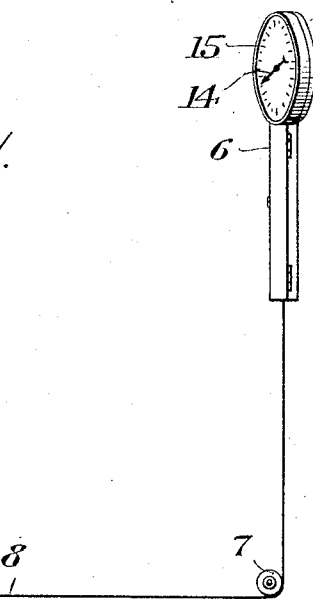
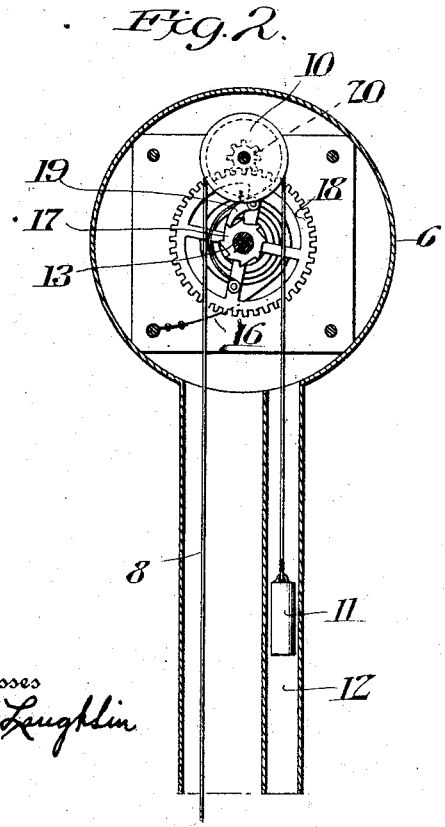
Witnesses
M. E. Laughlin
Inventor
G. Nuesell,
By Victor J. Evans,
Attorney

UNITED STATES PATENT OFFICE.

GERARD NUESELL, OF NEW YORK, N. Y., ASSIGNOR OF ONE-HALF TO FRANK VERMEULEN, OF NEW YORK, N. Y.

GASOLENE-TANK INDICATOR.

1,171,632. Specification of Letters Patent. Patented Feb. 15, 1916.

Application filed June 22, 1915. Serial No. 35,621.

*To all whom it may concern:*

Be it known that I, GERARD NUESELL, a citizen of Belgium, residing at New York, in the county of New York and State of New York, have invented new and useful Improvements in Gasolene-Tank Indicators, of which the following is a specification.

This invention relates to gasolene tank indicators and it consists in the novel features hereinafter described and claimed.

An object of the invention is to provide in combination with a gasolene tank especially adapted to be used upon automobiles and similar vehicles, means for indicating the height of the level of gasolene in the tank, the said indicating means being observable by the driver or operator of the machine from the seat thereof.

With the above object in view the invention consists in providing a vertically disposed tube supported upon the bottom of the gasolene tank and having pulleys journaled at the upper end thereof. A float is movably mounted in the tank and surrounds the said tube. An indicating instrument is mounted at the dashboard of the machine and means operatively connects the float with the said indicating instrument, whereby the instrument is caused to reveal or indicate the height of the level of gasolene in the tank.

In the accompanying drawing:—Figure 1 is a perspective view of the indicator showing the tank in section and parts broken away. Fig. 2 is an enlarged detail sectional view of the indicator proper. Fig. 3 is a transverse sectional view of the same.

As illustrated in the accompanying drawing, the tank 1 is of any usual pattern and the tube 2 is mounted on the bottom thereof. The said tube is open throughout its length and pulleys 3 are journaled at the upper end thereof. A float 4 is movably mounted in the tank 1 and surrounds the tube 2. A pulley 5 is journaled at the bottom of the tank 1 below the lower end of the tube 2 and an indicator proper 6 may be mounted at the dashboard of the machine or at any other point where it may be readily observed by the operator of the machine. A pulley 7 is adapted to be journaled upon the body of the machine at a point below the indicator proper 6. A flexible element 8 is trained under the pulleys 5 and 7 and one end portion of the said flexible element enters the indicator proper 6. The other end of the flexible element 8 is connected with cords 9 which are trained over the pulleys 3 and which are connected at one end with the intermediate portion of the float 4. A pulley 10 is journaled in the indicator proper 6 and the flexible element 8 is trained over the said pulley 10 and a weight 11 is attached to the end of the element and the said weight is guided in a channel 12 provided in the body of the indicator proper 6. An arbor 13 is journaled in the body of the indicator 6 and carries at one end an arm 14 adapted to move over a dial face 15. One end of a coiled spring 16 is attached to the body of the indicator 6 in a manner as shown in Fig. 2, and the other end of the said coiled spring is connected with the arbor 13. A ratchet wheel 17 is fixed to the arbor 13 and a gear wheel 18 is journaled upon the arbor 13. A spring pressed pawl 19 is pivotally mounted upon the gear wheel 18 and engages the teeth of the ratchet wheel 17. The gear wheel 18 meshes with a gear wheel 20 attached to the side of the pulley 10.

From the above description taken in conjunction with the accompanying drawing it will be seen that under the influence of the weight 11 the flexible element 8 will be maintained in a taut condition. Assuming that the tank 1 has been filled with gasolene and that the said liquid is being used from the tank. As the level of the liquid in the tank descends the float 4 follows the same, and hence the cords 9 are moved longitudinally over the pulleys 3. Inasmuch as the cords 9 are attached to one end of the flexible element 8, the said element is moved longitudinally and during this movement it rotates the pulley 10 and elevates the weight 11. As the pulley 10 rotates, the gear wheel 20 turns with the same and the said gear wheel 20 rotates the gear wheel 18. Inasmuch as the teeth of the ratchet wheel 17 are maintained in engagement with the spring pressed pawl 19 under the influence of the spring 16, the arbor 13 turns with the gear wheel 18, consequently the indicator arm 14 moves over the dial face 15 and the position of the arm 14 over the face of the said dial indicates the level of the liquid in the tank 1. When the supply of gasolene in the tank 1 has become exhausted and it is again replenished the float 4 moves from the lower portion of the tank 1 to the upper portion thereof and hence the cords 9 move down through the tube 2 and the flexible element 8 moves toward and up into the indicator proper 6, under the influence of the weight 11. This, of course, rotates the pulley 10 and the adjacent gear wheel 20, whereby the gear wheel 18 is rotated and the spring pressed pawl 19 engages with the teeth of the sprocket wheel 17, to turn the arbor 13 so that the arm 14 is brought to an initial position over the dial face 15.

It is apparent that by disengaging the spring pressed pawl 19 from the teeth of the ratchet wheel 17, the arbor 13 may be turned and the indicator arm 14 may be placed at any desired initial position over the dial face 15. When the arm 14 is brought to a desired initial position over the dial 15, the pawl 19 is permitted to engage the teeth of the ratchet wheel 17 and thus the parts are in operative engagement with each other and the operation just before described may take place.

From the above description taken in conjunction with the accompanying drawing, it will be seen that a gasolene tank indicator of simple and durable structure is provided and that the parts mutually coöperate with each other to indicate the height of the level of gasolene in the tank.

Having described the invention what is claimed is:—

A gasolene tank indicator comprising a tank, a float movably mounted therein, pulleys located in the tank, a tube mounted in the tank, a pulley journaled at the bottom of the tank below the said tube, flexible elements connected with the float and trained over the first mentioned pulleys and joined together and entering the tube, a flexible element trained under the second mentioned pulley and entering the tube and connected with the first mentioned flexible element, an indicator proper, a pulley journaled therein, the second mentioned flexible element being trained over the last mentioned pulley, a weight attached to the end of the second mentioned element, an indicator arm mounted at the indicator proper and means connected with the last mentioned pulley for turning the said arm.

In testimony whereof I affix my signature in presence of two witnesses.

GERARD NUESELL.

Witnesses:
FRANK VERMEULEN,
GEO. A. BYRNE.

Copies of this patent may be obtained for five cents each, by addressing the "Commissioner of Patents, Washington, D. C."